Patented Mar. 25, 1930

1,751,724

UNITED STATES PATENT OFFICE

ALFRED BREWERTON CRAVEN, OF SELBY, ENGLAND

MANUFACTURE OF A SOLID RESIN FROM THE SEMIFLUID RESINOUS MATTER EXTRACTED FROM CRUDE GUTTA-PERCHA AND/OR BALATA

No Drawing. Application filed July 23, 1927, Serial No. 208,068, and in Great Britain January 1, 1927.

This invention has for its object the conversion of the sticky resinous matter extracted from crude gutta percha and/or crude balata into a solid resin, thus extending the field of commercial use of this resinous matter.

As imported into this country, both gutta percha and crude balata contain considerable amounts of resinous matter often reaching 40 to 50 per cent of the weight as imported.

In the case of both gutta percha and balata, before application in the arts for some purposes, it is necessary to remove part or substantially all the said resinous matter. This is obtained as a sticky semi-fluid and is a by-product of little commercial value, hereafter referred to as sticky semi-fluid resin.

The usual method of obtaining this sticky semi-fluid resin from the crude gutta percha and/or crude balata is by extracting in the cold with a light petroleum spirit and removal of the spirit by evaporation when the sticky semi-fluid resin is left as the residue.

This stick semi-fluid resin is oxidized in an oxidizer, for instance, one constituted by a cylindrical machine fitted in a horizontal position with an agitator running along the horizontal axis consisting of a shaft with arms which, in revolving, subdivide the resinous matter and so present a large surface to the air which is blown through the cylinder.

The cylindrical machine is jacketed for steam and the temperature of the charge is raised to from 60° C. to 100° C. during the oxidation. An addition of 1% of resinate of manganese or other siccative helps the oxidation and shortens the time needed to produce a resin which solidifies on cooling. An example of the production of the solid resin is given below:

8 cwt. of the sticky semi-fluid resin above described is charged into the Bedford oxidizer and 1% of resinate of manganese added and the temperature raised to 80° C. The agitator is started and a current of air blown through. The temperature is raised to 100° C. after 4 hours and after 10 hours from the commencement, the charge is run out, when it cools to a pale brittle resin. The weight of the solid resin as run out of the oxidizer is substantially the same as the weight of the semi-fluid resin charged; the increase in weight due to oxygen absorption being closely counter-balanced by a small loss of volatile matter.

The essential conditions for the production of this solid resin are an elevated temperature and intimate contact with air. The presence of a siccative has exactly the same effect as such bodies have in the drying of drying oils, namely, that of assisting the oxidation.

It will be seen that the essential conditions above described can be brought about by blowing air through the heated sticky semi-fluid resin or by any means which present air to the sticky semi-fluid resin whilst heated.

The method described in the example is typical of an economical method of working.

The resulting solid resin is of a very pale amber colour and contains usually a very low percentage of free acids, approximately 3%; it only requires 0.6% of caustic potash to neutralize its acidity; it is fluid at 140° C., completely soluble in benzene, ethyl ether and linseed oil; it is soluble to the extent of about 90% in industrial alcohol (94%), kerosene and gasolene.

This small amount of free acids may be neutralized during the oxidation by the addition before oxidation of one half of one per cent of quick-lime on the weight of the semi-liquid resin.

The solid resin can replace rosin (colophony) and the varnish gums for most of their commercial uses; it is particularly suitable for compounding with vulcanized rubber to constitute a cement composition for linoleum and like materials.

What I claim and desire to secure by Letters Patent is:—

1. The process of manufacturing a solid resin from a sticky semi-fluid resin extracted from gutta percha and from balata, consisting of the steps of mixing one per cent of resinate of manganese with said semi-fluid resin, heating and agitating said mixture and passing a current of air therethrough while agitated.

2. As new product of manufacture, a solid resin consisting of transformed semi-fluid resin extracted from gutta-percha and extracted from balata having the following properties: it is pale yellow in colour, has extremely low acidity, is readily soluble in petroleum spirit and in coal-tar spirit; is suitable for cellulose varnishes and for oil varnishes, and becomes plastic when softened by heat.

In testimony whereof, I affix my signature.

ALFRED BREWERTON CRAVEN.